United States Patent [19]

Fox et al.

[11] 4,106,097

[45] Aug. 8, 1978

[54] ENERGY CONSERVATION CONTROL METHOD

[75] Inventors: Richard Q. Fox, Orlando; James I. Millholen, Winter Park, both of Fla.; John H. McWhirter, Penn Hills, Pa.

[73] Assignee: Westinghouse Electric Corp., Pittsburgh, Pa.

[21] Appl. No.: 791,741

[22] Filed: Apr. 28, 1977

[51] Int. Cl.² ................... G06F 15/06; G05B 15/00
[52] U.S. Cl. ................................. 364/492; 307/52; 307/62
[58] Field of Search ............ 235/151.21; 307/35, 307/39, 41, 52, 62; 324/103; 364/492-494

[56] References Cited

U.S. PATENT DOCUMENTS

| | | | |
|---|---|---|---|
| 3,296,452 | 1/1967 | Williams | 235/151.21 |
| 3,522,421 | 8/1970 | Miller | 235/151.21 |
| 3,652,838 | 3/1972 | Dillon et al. | 235/151.21 X |
| 3,659,114 | 4/1972 | Polenz et al. | 235/151.21 X |
| 3,697,768 | 10/1972 | Johnston | 235/151.21 X |
| 3,862,430 | 1/1975 | Lenhart et al. | 307/62 X |
| 3,872,286 | 3/1975 | Putman | 235/151.21 |
| 3,987,308 | 10/1976 | Burch | 307/52 X |
| 4,023,043 | 5/1977 | Stevenson | 235/151.21 X |
| 4,034,233 | 7/1977 | Leyde | 235/151.21 X |

OTHER PUBLICATIONS

Energy Conservation Seen as Major DP Application, Article, Computer World, Sept. 27, 1976, p. 11.

*Primary Examiner*—Edward J. Wise
*Attorney, Agent, or Firm*—C. M. Lorin

[57] ABSTRACT

An energy conservation schedule is followed automatically in response to production activity in a plant facility. The demand of power from the utility company is used as an indicator of actual production activity. The ON/OFF ratio of non-production loads is reduced to conserve energy and such adjustment is automatic in relation to actual demand of power. In one embodiment of the invention, a higher level of constraint is imposed on the non-production loads as soon as the demand has passed a critical threshold downward. In a second embodiment of the invention, control of the demand is installed in the plant in order to meet a demand limit at the end of a period of control involving the production loads as well as non-production loads under constraints. In the latter situation, whenever demand control is ineffective for a full control period to affect switching of the production loads, the system goes to energy conservation with a higher level of constraints applied to the non-production loads.

7 Claims, 14 Drawing Figures

ENERGY CONSERVATION CONTROL METHOD

REFERENCE TO COPENDING PATENT APPLICATIONS

Cross reference is made to copending patent application Ser. No. 791,827, filed Apr. 28, 1977 entitled "Control System For Optimizing The Power Demand Of An Industrial Plant" filed concurrently by R. Q. Fox; D. Sigut and J. H. McWhirter assigned to the same assignee as the present application.

BACKGROUND OF THE INVENTION

The present invention relates to a control method for the conservation of energy in an industrial plant supplied by a utility company.

There are two competing economic interests in the user's plant regarding energy consumption. One is to meet the plant production requirements; the other is to limit billing from the power company. Billing extends for accounting purposes over a full month - the billing period. Control of the loads, to keep the amount of the KW-Hour within an assigned limit while exercising decisions to switch or not to switch specific loads into or out of production, is effected during shorter periods of 15 minutes - the demand period. Power demand control during the demand periods keeps the accumulated KWH within the prescribed limit, e.g., not to exceed an amount of available power acceptable at a given rate. Power demand control also insures within the demand limit the most effective utilization of the loads available or required during such period of control. Power demand control most efficiently uses the assist of a computer. In contrast to power demand control, computer techniques have evolved which aim at energy conservation. By energy conservation is meant reducing energy consumption so that over the billing periods the number of KWH billed will be minimized.

It is known from an article in "Computer World", Sept. 27, 1976, page 11, entitled, "Energy Conservation Seen As Major DP Application" to use computers in order to save energy for industrial and commercial applications. To this effect, it is suggested in this article to "optimize a facility's load profile", meaning by this to monitor and optimize with computers the scheduling of energy consumption within a facility. Under this concept, the load will be rescheduled at certain times of the day, week, or year which are more favorable from a point of view of energy production, in particular by avoiding the periods of peak consumption, e.g., of peak production of energy.

The present invention proposes to apply computer techniques for energy conservation with an entirely different concept. The high peak hours are not used as a basis to reschedule loads to low peak hours. Instead, within a plant energy consumption by the user is automatically reduced whenever this can be done without harm to the production.

The object of the present invention is to automatically reduce energy consumption in relation to the level of the demand of power within a plant facility.

Another object of the present invention is to reschedule the loads in a plant facility in accordance with a predetermined load pattern whenever the demand of power in the plant reaches a preestablished level.

A further object of the present invention is to control the demand of energy in a plant by establishing a load pattern in accordance with a priority schedule defining a required production level, and to abandon said priority schedule load control to control the consumption of energy in accordance with a second load pattern whenever the demand of energy falls below a predetermined level.

Still another object of the invention is to control energy consumption in a plant in accordance with the production activity in the plant by reference to the actual demand of power in the plant.

Further, an object of the present invention is to automatically change the priorities and modify the constraints of the loads in an industrial plant in relation to a change in the activity therein.

Finally, another object of the present invention is to relate changes in the acitivity of an industrial plant to human activity in the plant, and to establish standards of consumption of energy in the plant reflecting more closely such related changes.

SUMMARY OF THE INVENTION

Demand is an indication of plant activity. In accordance with the present invention the demand is used to establish a schedule of energy conservation in a user's plant facility supplied with energy from a utility company. The schedule of energy conservation takes into account loads categorized as production loads and non-production loads. When the demand of power falls during a given billing period under a predetermined level, it is assumed that the production loads have reached such low levels that the non-production loads can be dispensed with in part or in totality in accordance with the established schedule of energy conservation. The ON/OFF ratio of such non-production loads is reduced to conserve energy. The ratio of the low level demand to the peak demand of the plant during production can be used to interpolate the ON-OFF ratio to be selected at any low level demand condition. As a result, energy conservation control is effected continuously for all levels of production from demand period to demand period down to zero production in the plant.

Instead of such continuous energy conservation control from peak production, energy conservation can be implemented by steps whenever the demand at the end of a demand period has fallen short of the target assigned by demand control by a predetermined margin.

The invention also resides in a control method for automatically adjusting power consumption in an industrial plant during any particular demand period so as to hold the power demand at the end of such period to a pre-established demand limit, wherein means is provided for deriving an actual demand at the end of any demand period and means is also provided responsive to said actual demand relative to a given demand period for switching at least a portion of selected loads in the plant.

More specifically, said switching means is made responsive to a predetermined limit assigned to said actual demand.

The invention particularly provides for switching OFF switch selected loads and/or modifying pre-established constraints thereof in a sense to reduce the energy consumption during said demand periods.

The control method according to the invention provides for specific steps as follows: assigning to selected loads a conservation and a production status; shifting the status of at least one of said selected loads from a poduction to a conservation status in response to a predetermined change downward in the energy demand registered during a preceding demand period; and changing back the status of at least one of said selected loads from a conservation status to a production status in response to a predetermined change upward in the energy demand registered during a subsequent demand period.

The invention includes also a control method in which the industrial plant possesses loads having established constraints and in which the actual demand recorded is used to modify the established constraints; controlling means is provided operative during each of said demand period to exercise said constraints.

The invention is applicable independently or in combination with a power demand control system. It should be understood that such combination is not limited to any particular control system for automatically adjusting power demand in a industrial plant through one or more of the demand periods of the utility company. The invention can be used as well with a control system such as described in U.S. Pat. No. 3,872,286 of Richard E. J. Putman issued on Mar. 18, 1975 and entitled "Control System And Method For Limiting Power Demand Of An Indisutrial Plant". As a matter of fact, for the purpose of describing the preferred embodiment to be given hereinafter of the present invention, the specification, drawings and claims of U.S. Pat. No. 3,872,286 are hereby incorporated by reference.

The present invention also is applicable to a system for power demand control such as described and claimed in the patent application concurrently filed in the names of R. Q. Fox, D. Sigut and J. H. McWhirter, for a "Demand Control System With Self-Optimizing Target".

BRIEF DESCRIPTION OF THE DRAWINGS

The invention will now be described in the context of the supply of electrical energy by a utility power supply company to an industrial plant, and reference shall be made to the accompanying drawings in which.

GENERAL DESCRIPTION OF THE STRUCTURAL AND OPERATIVE CHARACTERISTICS OF THE POWER DEMAND CONTROL SYSTEM OF U.S. PAT. NO. 3,872,286

For the sake of clarity and for the purpose of illustration only, the present invention will be described in the context of the power demand control system of U.S. Pat. No. 3,872,286. It is understood, however, that since the control method according to the present invention is being used essentially for energy conservation, it does not require to be associated with a power demand controller. The concept of energy conservation as conceived herein is entirely separate from the known concept of a power demand limit regulating the turning ON and OFF of the loads in a plant. Therefore, the energy conservation control method according to the present invention may be used independently from the particular power demand control system of U.S. Pat. No. 3,872,286 which will now be described.

Figure 1:
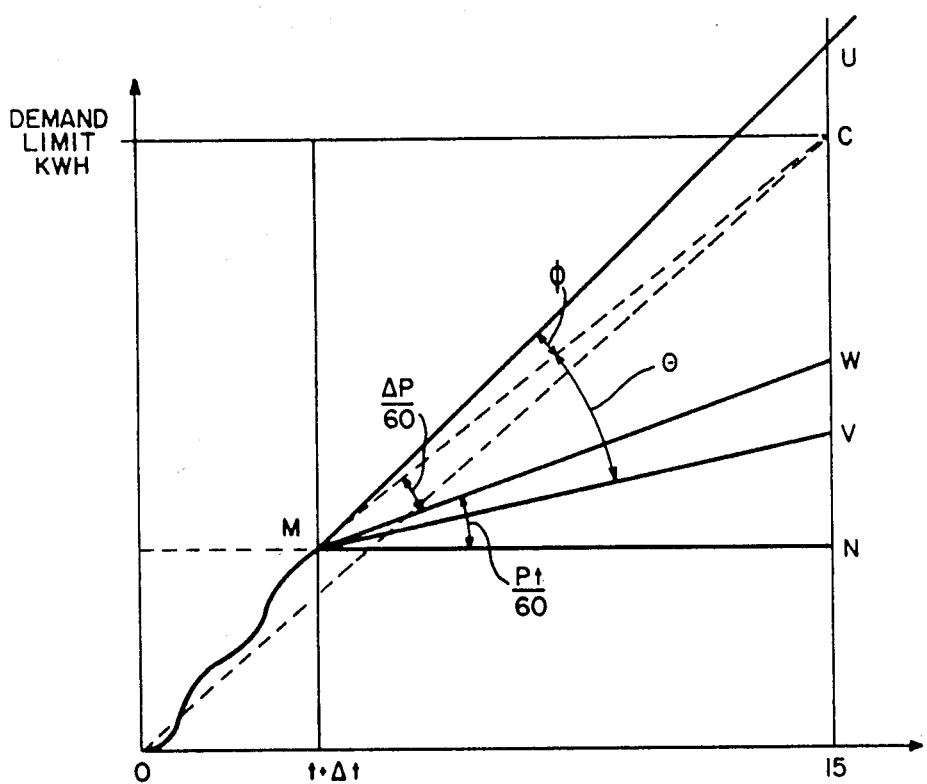
FIG. 1 illustrates diagrammatically the principle of calculation of the demand error used in a control system of the prior art for power demand control.

FIG. 1 illustrates the principle of calculation of the error for any point M along the trajectory during a demand period of 15 minutes. A clock installed by the power supply company determines the initial time of each demand period, (or the final time of a preceding demand period). The watthour meter provides a "KHW pulse" which represents the magnitude of the power which has been consumed during a certain instant $\Delta t$ corresponding to a full rotation of the disc of the meter, thus representing a constant increment or unit of energy (KWH). Thus, the $\Delta t$ interval appearing along the time axis is essentially variable. This time interval is detected as a representation of the slope at point M and it represents the power $P_t$ in KW hour/hour. If the load of the plant is maintained in the same condition until the end of the 15 minute period, the energy curve will follow the tangent MW. However, the Demand Limit should be at C. Therefore there is an error CW by default, which in terms of power is:

$$\Delta P = \frac{(60) \times CN}{15 - t} - P_t$$

as is evident from the geometry of triangles MNC and MWC. Having determined Slope = 60/$\Delta P$ by triangulation, and the sign of the error, depending upon whether the intersection point W is above or below the target C, control is effected by selectively adding or shedding suitable loads in the plant. In order to more closely follow the target, a deadband may be provided on either side of the trajectory by defining two angles $\phi$ and $\theta$ which should not be exceeded. The deadband will contain excessive control but will leave free control of the loads as long as the projected tangent remains within two limits MU and MV (FIG. 1) so defined. Such deadband is made variable as will be explained later. The upper limit MU will represent the "decrease vector" and the lower limit MV of the deadband will represent the "increase vector" for control.

It will be hereinafter assumed that the power demand results from a plurality of loads which at least in part can only be switched ON or OFF under constraints existing either at all times or occurring at least at the instant of control. However, by ON and OFF, it is understood that the loads, if electrical, need not be switched by electrical connecting or disconnecting. A power consumption can be increased or decreased by mechanical connection or disconnection of the load as well, such as by means of a clutch or valve actuation.

When several loads are available for being switched ON or OFF, there is an ambiguity as to the response that can be made for proper control. For example, at times a load switched off by the controller may already be off. The particular load to be switched ON by the controller might have been previously put out of service. It is also possible that control of the demand be prevented by an overriding and external control equipment associated with the load, as is usual with air conditioners, chillers, or air compressors, for instance. Other types of constraints can be found in the particular industrial plant of a customer to a power company, and are within the scope of application of the present invention.

A judicial selection is made of the loads in order to respect these constraints by eliminating, from the priorities set among the loads, those which are found to be in violation of the existing or anticipated constraints. Thus the priorities are not only determined by a predetermined classification of the loads, they are also changed in the course of the control process in order to take into account the history of the loads as it appears from a reappraisal of the availability to be switched ON or OFF, during the demand limit control process.

The selection of a load not only depends upon the overall status of the different loads, but also upon the behavior of any particular load in the user's plant. The control system therefore provides for a dynamic allocation of priorities for the selection of the loads to be controlled at any particular time.

The system also provides for relative control, rather than an absolute control of the loads, any selected and controlled load change being effected independently from the base load and from non-controlled loads.

The control system also takes into account the established constraints. For instance, besides interruptible loads which can be selected to be shed or to be added, there may be in the plant loads having a non-controllable status, which otherwise could defeat the control system. However, the control system may also limit its own capability of switching loads in order to accept the non-controllable loads as a favorable factor of correction when in the demand limit control mode, in particular by making use of a deadband.

The control system in the demand limit control mode moreover calls for the determination of the constraints either off-line or on-line in order to be able to ascertain with improved accuracy the anticipated effect of control and prepare for the right decision in selecting the loads to be controlled at a given instant, or for an emergency action by the present control operation. To this effect a special technique of simulation may be provided on the basis of actual load behavior in the user's plant, and such technique of simulation would be used either as an off-line information providing system to be used preparatory to running of the control system according to the invention, or as an online coordinated helper system for constantly revising predictions and updating data during control of the loads in real time.

Further, the control system provides, in the demand limit control mode, for shedding loads or adding loads to limit the total power demand as desired at the end of any given demand period, with modifications in order to maximize the needs for particular loads of the user by minimizing the effect of control of the plant's constraints. To this effect control might not be exerted during a first portion of the demand period, on the assumption that sufficient possibilities of meeting the objectives are still left and are available, as a result of an improved control and improved selection, in the latter part of the demand period. Moreover, when control is performed, during a second and major portion of the demand period, the technique involves the use of a deadband, namely the use of vector limits within which no switching (ON, or OFF) of a load is effected. In order to allow switching of larger loads when they are selected under the assigned priorities, the control system may be operated with a variable deadband. In addition, a temporary target below the objective can be imposed for control until a certain time limit relatively close to the end of the demand period and when such limit has been reached, the bias so established is progressively reduced to zero until the end of the demand period, at which time the demand limit is reached with substantial accuracy.

Figure 2:
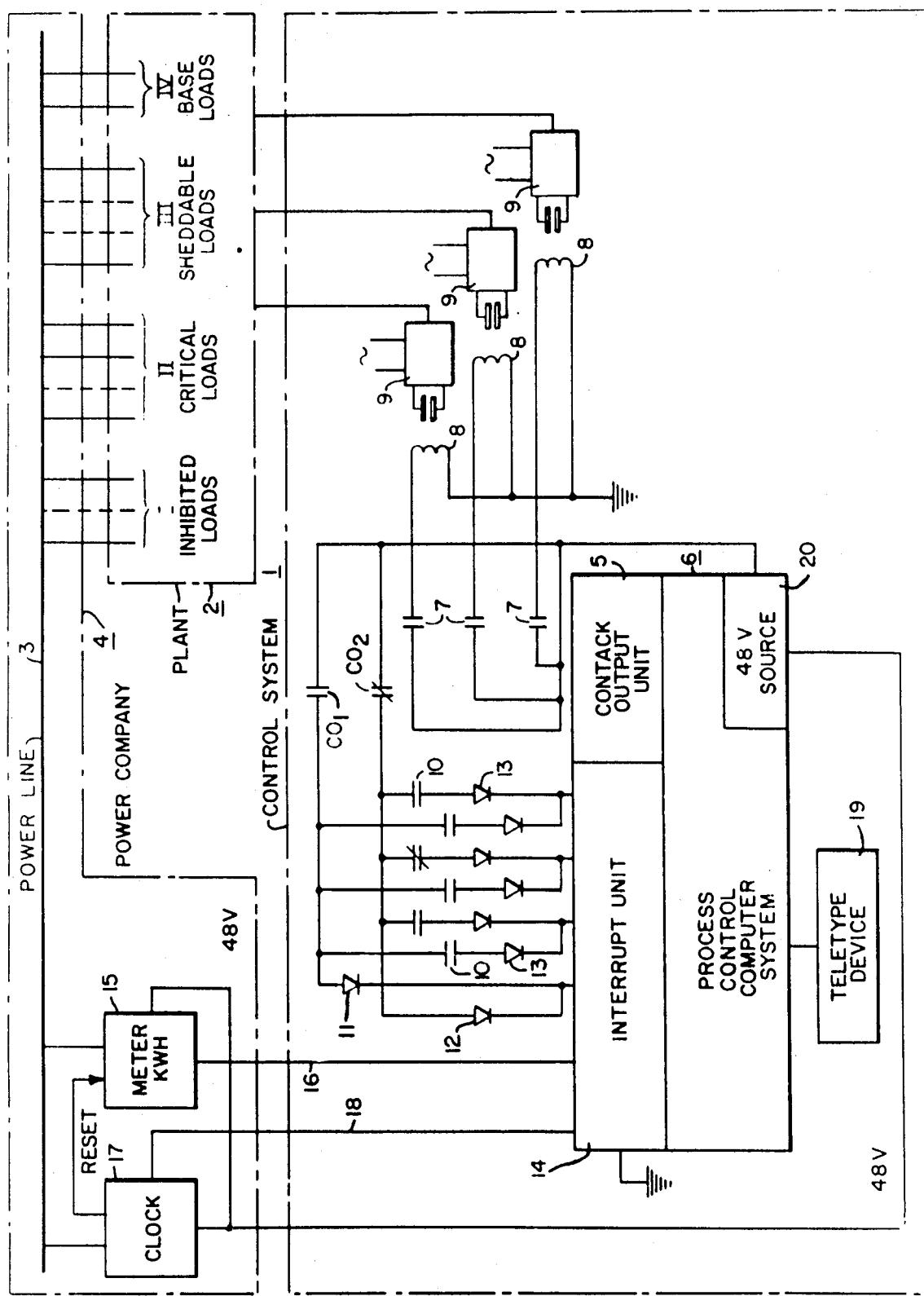
FIG. 2 is an overview of a control system implementing to the present invention.

Referring to FIG. 2 there is shown an overview of a control system 1 which may be used to implement the present invention and control the loads of a plant 2 supplied with electrical power on the power supply lines 3 of a power supply.

In the plant there is a base load represented by equipment which is constantly present or at least, if the equipment is switched ON and OFF, such occurrence has in its narrowness a sufficient pattern to equate to a fairly steady load. Therefore, the base load is by definition a non-sheddable load. Although control of the base load is not possible, the base load affects by its presence the control of the sheddable loads, since it accounts for a portion of the KWH consumed at any given time. Typical of the base load are the lighting and heating loads, and also certain groups of motors and equipment.

An inhibited load is defined as a load which will be permitted to be switched ON during the first minute of any demand period but will be switched OFF after a certain duration has elapsed and will be inhibited from being switched on again until after the next demand period has begun. For these loads the control system needs to know the duration of ON time from the beginning of a given demand period, and at a given instant whether the load is available for use or not. If the load is available, it will be qualified as permissive.

The sheddable loads are by definition the loads which may become available on a priority basis to be switched ON or OFF, by the control system. This is a general quality of the loads which are not base loads provided they have not a "non-controllable" status. Thus, the constraints of the present industrial plant may limit such "sheddability".

Selection and control of the loads within such constraints is achieved in order to maximize the utilization of the power supplied and minimize the cost of the energy. Heretofore, a sheddable load essentially is a load which can be switched ON or OFF during a certain demand period without affecting the operation of the plant.

An important limitation in the control of an interruptible load is the ON time and the OFF time. It is not advisable to start up a load too often, for instance, for a motor this may have a damaging effect on the windings. Also, electrical surges caused by starting are costly. It might also be economically desirable not to leave an equipment off during an excessive time interval. When an excessive off time exists, such equipment must be switched on and and another alternative has to be sought if the shedding of some load is the control action required at that time. The ratio between ON time and OFF time may also introduce a limitation, requiring to keep ON a load.

One important consideration in a power demand control system operation is that while sheddable loads may be available for switching, it is possible to spread the ON times and OFF times within a given demand period and between demand periods in order to spread wear.

A last category of load is the critical load. These are loads which are ON and OFF under external requirements at the plant. For instance, the air conditioners and the compressors follow local conditions. Local control might override action by the control system. Switching ON or OFF of such loads although required by the demand control system, could be ineffective since the running time for such a load is not known in advance. For this type of load switching ON/OFF is constantly monitored.

Referring to FIG. 2, the loads are controlled by a contact output unit 5, which is part of a process control computer system 6. The contact output unit 5 does operate a plurality of load contact outputs 7, each of which closes the energizing circuit of a coresponding relay 8 to actuate the switching element 9 of a load. Such switching element may be the starter of an electrical motor, the plunger of the valve of a compressor, etc.

When a load is in the switched ON condition, a corresponding status contact interrupt 10 is closed as shown on FIG. 2, with the contacts being arranged so as to correspond to the loads. There is shown in FIG. 2 two such groups of contacts with one group being associated with a diode 11 and one scan contact output CO1, and the other group being associated with a diode 12 and another scan contact output C02. Respective diodes 13 are connected in circuit with corresponding status contact interrupts 10 to establish a circuit from a 48V source 20 provided by the computer system, to ground with the associated diode 11, or 12. As shown on FIG. 2, concurrent closing of one scan contact output such as C02 and one particular status contact interrupt 10, such as shown on the Figure, permits identification by the interrupt unit 14 of the status of the particular contact as being one of Group 2 (C02 on the Figure).

In order to control the power demand by shedding or adding loads, the control system 1 is responsive to the power consumption continuously recorded by the meter 15 of the power supply company. The process control computer receives over a line 16 the KWH pulse which, as a Δt, characterizes the consumption at any particular instant within the demand period. The power supply company also provides a clock 17 which determines the beginning and the end of each demand period. In the instant case it is assumed that each such demand period lasts 15 minutes. For each turn of the disc of the meter 15 there is a pulse generated which will be hereinafter called "KWH pulse". The succession of these pulses represents on a time scale the power consumed for one turn of the disc. The process control computer system 6 through the interrupt unit 14 assesses the status of the status contact interrupts 10, and more generally monitors all the input data fed into the computer system regarding the individual loads in the plant with their constraints, effectuates calculations, makes decisions which are converted, after each of the above-mentioned KWH pulses, into whatever load control action is necessary through the controlled operation of the relays 8.

Included as part of the control system 1, is the process control computer system 6. This computer system can be a digital computer system, such as a Prodac 2000 (P2000) sold by Westinghouse Electric Corporation. A descriptive book entitled "Prodac 2000 Computers Systems Reference Manual" has been published in 1970 by Westinghouse Electric Corporation and made available for the purpose of describing in greater detail this computer system and its operation. The input systems, associated with the computer processor are well known and include a conventional contact closure input system to effectuate scanning of the contacts or other signals representing the status of the equipment. Also, operator controlled and other information input devices and systems are provided such as the teletypewriter 19 shown in FIG. 2. The contact closure output system is also conventional and part of the Prodac 2000 general purpose digital computer system sold.

Although FIG. 2 shows electrical loads which are sheddable or which can be picked up by the demand control system, it should be understood that switching of an electrical load is not the only control action within the scope of the present invention. If it is found not necessary or desirable to limit the demand by switching the actual electrical load on, or off, in every case, the same result can be obtained by other alternatives. For instance, fan loads can be reduced to some 20% of normal by closing the inlet vanes or damper by means of a servomotor, rather than switching off the motor. This operation could be performed relatively frequently and for short periods (for example towards the end of a demand period as a fine trim), whereas there is a limited number of starts per hour allowed for larger motors. When the load involves eddy current couplings or pneumatic clutches, the mechanical loads can be disconnected from their motors. With air compressors having inlet valves, these may be held open by the pressure control equipment when the pressure is high. The control of compressors to maintain demand below the desired level would operate in parallel with the pressure control system with the same goal. These alternatives avoid increasing the cost of maintenance of plant equipment.

The computer system used in the control system according to the invention includes both Hardware and Software. For instance, the interrupt unit 14 is associated with an interrupt handler (50 in FIG. 3). Software is being used as a convenient means of quickly and efficiently performing operations as required in monitoring data, doing calculations, making decisions and translating treatment of information into control action within the short time intervals determined by the recurrent transmission of KWH pulses from the power supply company meter 15.

Figure 3:
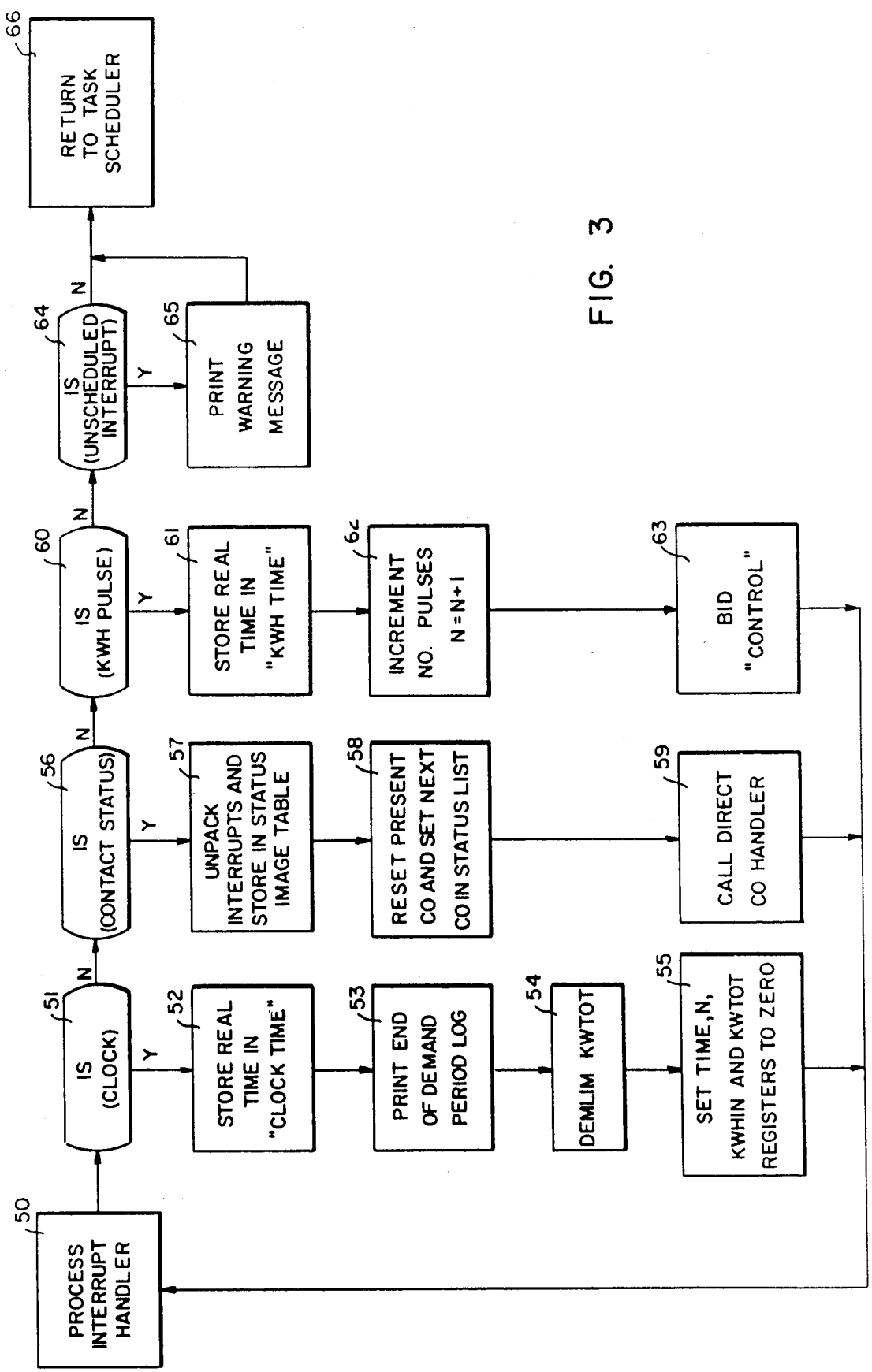
FIG. 3 is a flow chart explaining the operation of the Process Interrupt Handler which is part of a control system for power demand control in the processor.

It is observed that the inputs consist of interrupts which are successively handled by the process interrupt handler (see FIG. 3). One interrupt will receive the 48V DC pulse generated by the external clock and is used to reset the associated registers in the computer when it is received. Another interrupt will receive a train of 48V DC pulses transmitted by the meter 15, each pulse representing KWH (or KVAH) consumed. Another interrupt could be reserved for a second KWH meter if needed. Three other interrupts (the scan contact interrupts 10 of FIG. 2) will receive a status which corresponds to the status of one load contact in the plant and belongs to one group of three associated with one scan contact output (C01, C02 on FIG. 2).

The normal operator interface with the system will be via a teletypewriter 19. This device will also provide a log of system performance together with any other messages that may be required. Via the typewriter keyboard the operator will also be able to change the values of various constants relating to the system as a whole or to individual items of equipment. The time and date and on-peak and off-peak demand levels can also be changed using the same keyboard.

Having considered the Hardware aspect of the control system according to the invention, consideration will now be given to the software components of the computer system referring in particular to the flow charts of FIGS. 3, 4A, 4B and 4C.

Referring to FIG. 3, the operation of the interrupt handler 50 of the computer system is described. This program will receive (at step 51) an interrupt from the clock at the beginning of each demand period together with a KWH pulse (at step 60) from the KWH (or KVAH) meter 15 for each revolution of the disc.

In response to a clock pulse, the decision at step 51 is a yes, and the data are transferred to a buffer. These data include time (step 52) the demand limit desired at the end of the demand period (step 54 and coded as DEMLIN) which is set in the total kilowatt register (KWTOT). At step 53, the program puts data to be printed out for the preceding demand period. The next step (55) is to clear all registers in which accumulated values are stored including time into period and KWH during the period (time, number of pulses N, KWHIN, and KWHTOT registers). Prorated values of time and KWH are stored in those registers when the KWH pulse does not coincide with the clock pulse. The chain returns to the process interrupt handler 50.

If the interrupt relates to a contact status, as seen at step 56, the interrupt is stored at step 51 at the proper location to provide a status image of the array of contact interrupts 10 (FIG. 2). The present contact output is reset and the next contact output is set in the status list (at step 58). At step 59 the contact output handler which corresponds to the contact output unit 5 (FIG. 2) is bid, and the chain returns to the process interrupt handler 50. If the interrupt is the KWH pulse from the meter, as seen at step 60, this data is stored as real time in a "KWH TIME" register. For each turn of the disc of the meter, e.g., for equal increments of energy, one KWH pulse is received. The count is effected at step 62 (N = N + 1), and whenever required, there is a bid for control at step 63. This chain returns also to the process interrupt handler 50. Besides the preceding interrupts which directly determine operation of the control system, there may be other interrupts received, as seen at step 64. Such "unscheduled" interrupts cause at step 65 the printing of a warning message, and there is a return to the task scheduler of the computer system.

Figure 4A:
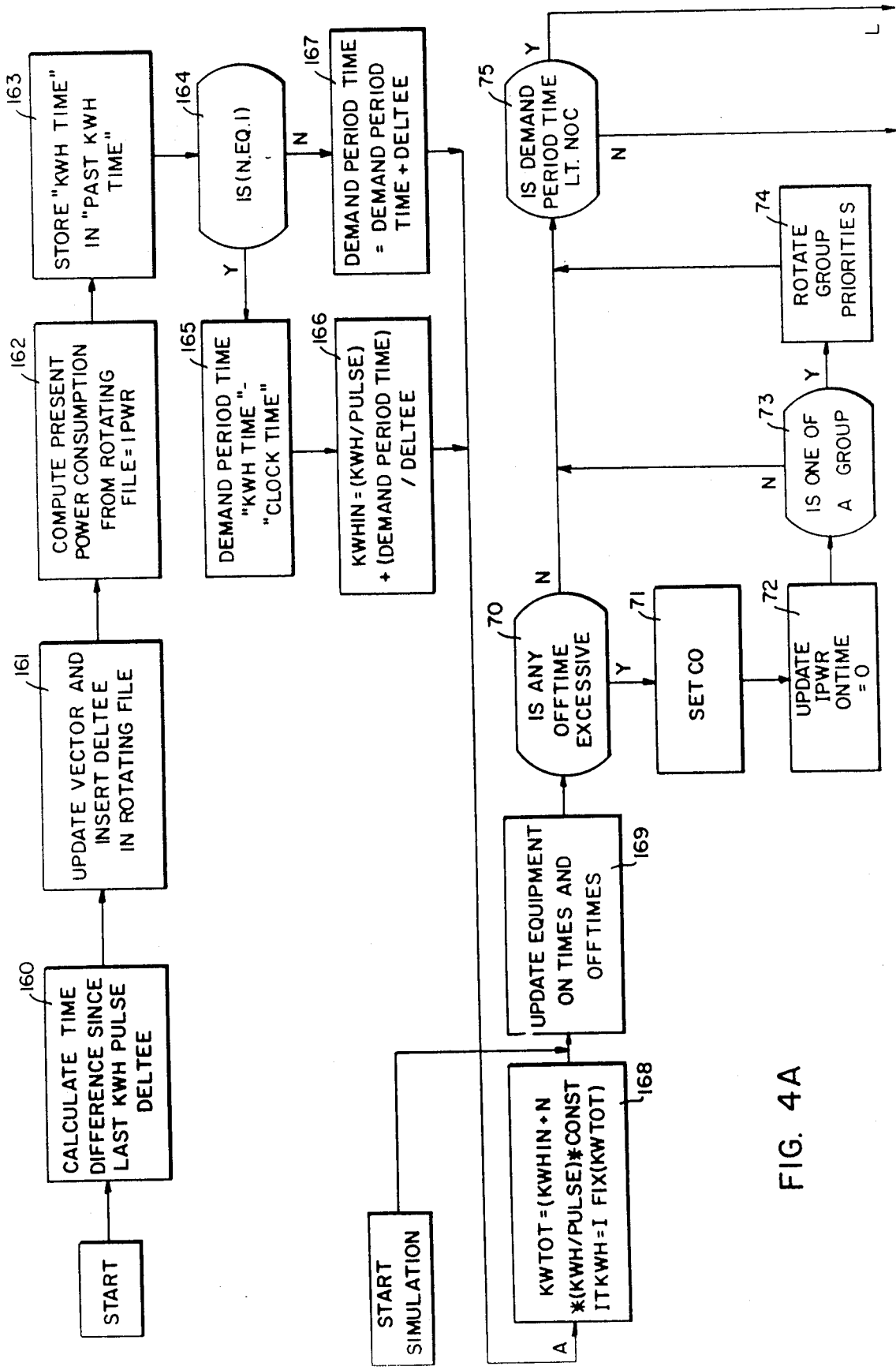
FIGS. 4A, 4B, and 4C show an illustrative logic flow chart of a program for power demand control.
Figure 4B:
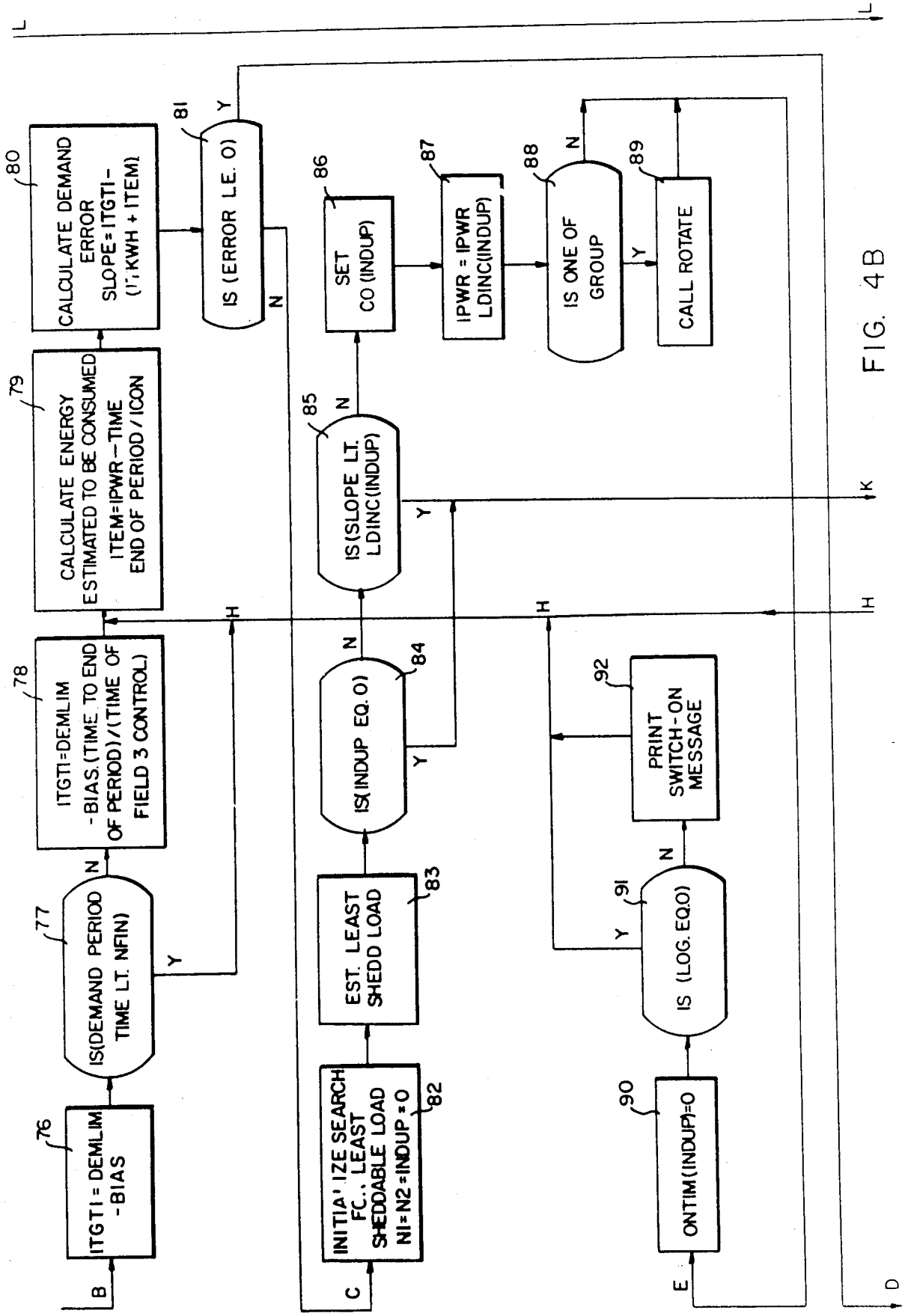
Figure 4C:
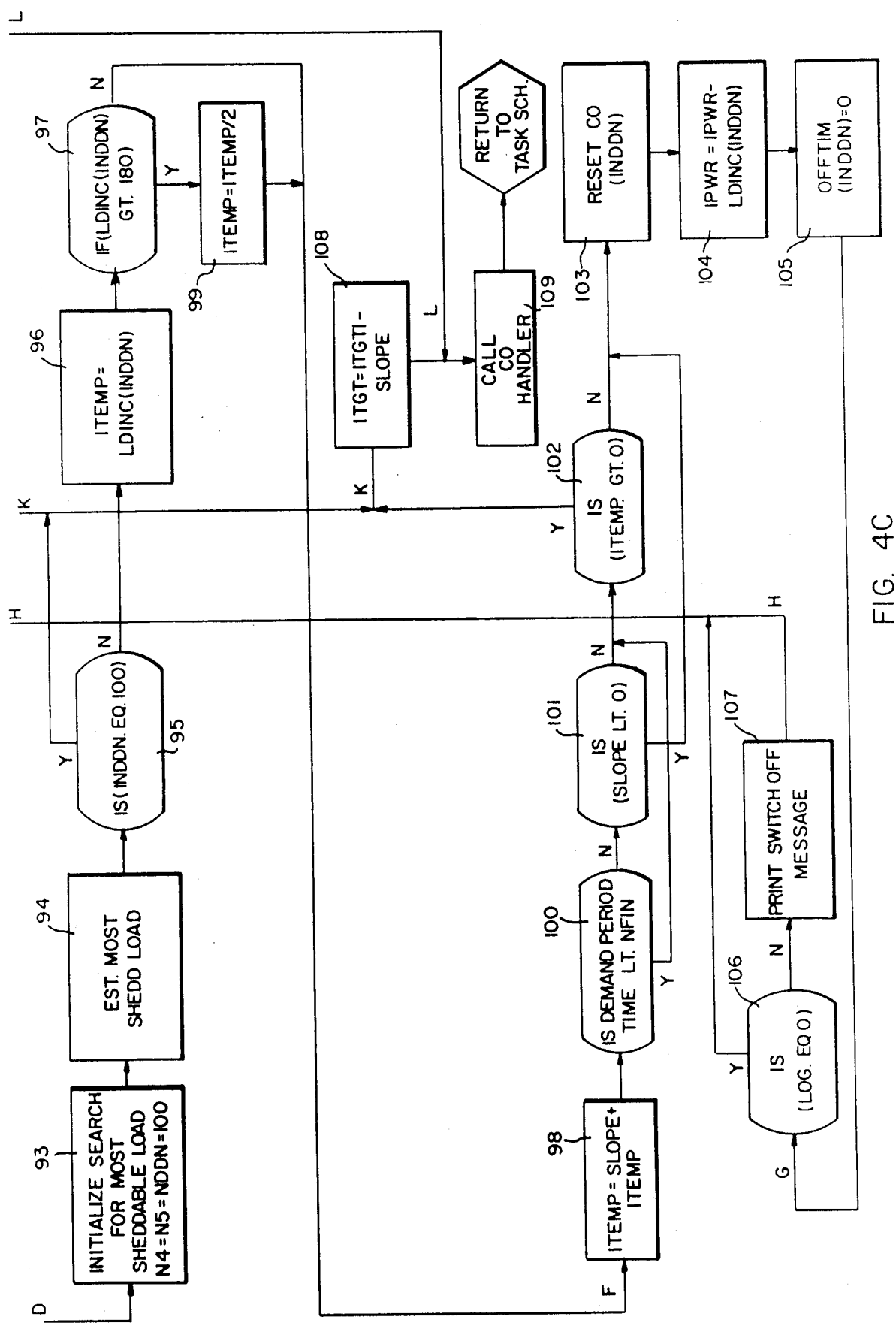

FIGS. 4A, 4B, 4C show a flow chart of the main control program, which is provided to explain the operation of the demand control system according to the present invention, When control starts, "DELTEE" e.g., the $\Delta t$ between two successive KWH pulses, is determined by difference. This is step 160. Then a rotating file is updated by adding the last of three successive vectors corresponding to three successive time $t_1$, $t_2$, $t_3$ being for the latest $\Delta t$ at step 161). At step 162, the present power consumption (IPWR) is computed from the rotating file, and from the present status IPWR is translated at step 163 into the "Past KWH TIME" register.

At step 162 the present power consumed is calculated by averaging for three successive points on the trajectory corresponding to times $t_1$, $t_2$ and $t_3$. To this effect an exponential filter is used such as:

$$P_t = \left[ a\left(a\left(\frac{k}{t_1}\right) + (1-a)\left(\frac{k}{t_2}\right) + \frac{(1-a)}{a}\frac{k}{t_3}\right) \right] \quad (7)$$

$$P_t = k\left[ a\left(\frac{a}{t_1} + \frac{1-a}{t_2}\right) + \frac{1-a}{t_3} \right] \quad (8)$$

where $0.1 < a < 0.4$ and $t_1$ is in hours and $k =$ KWH/pulse.

It is recalled here that while each KWH pulse is received for the same increment of energy (one turn of the disc of the KWH meter), the "DELTEE" represents the power consumed within the period. The first is obtained by integrating the DELTEES corresponding to all KWH pulses received during the period. The energy consumed is equal to the number of pulses multiplied by the meter factor (KWH/pulse). The decision at step 164 (since N is normally greater than 1) is to go to step 167. However, the decision at step 164 is to go to 167 where the demand period time is found to be the sum of the $\Delta t$'s in the period.

The DELTEEE corresponding to the first pulse after the clock pulse (N=1) belongs in part to the last demand period and only in part to the new demand period. In such case, the decision at 164 is to go through steps 165 and 166 which provide a prorated value of the KWHIN in proportion to the fraction of DELTEE pertaining to the new demand period. Accordingly, step 165 provides the time difference between KWH Time and clock time, and at step 166 the prorated value KWHIN is computed.

Looking to A on FIG. 4A, the next step is to compute KWTOT, e.g., the energy consumed during the present demand period until the particular iteration, converted to equivalent power at the end of the period. KWTOT is equal to N (number of pulses) *KWH/pulse *Constant plus the fraction prorated at step 66, if there is one, e.g., KWHIN. Since computation is done with a floating point for increased accuracy, conversion to integer is effected as indicated by ITKWH = IFIX (KWTOT) ($\epsilon$).

Then, at step 169 the system looks at the status of the ON times and OFF times of the loads, while adding the $\Delta t$ (DELTEE) and it is determined at step 70 whether any load exceeds the OFF time assigned to it. In such a case, a decision is made at 70 to set the contact output to switch the particular load ON (step 71) thereby not to violate the constraint. Since the load has been switched ON, the ON time of this particular load is set to zero (step 72). Also, the energy estimated to be consumed in the overall industrial load system (IPWR) must be updated in order to take into account the load so picked up. However, if the load exceeding its OFF time belongs to a class, or priority including several other loads in order to reduce wear, all the loads of the same class, or priority, are rotated. Rotation is effected at step 74.

Figure 5:
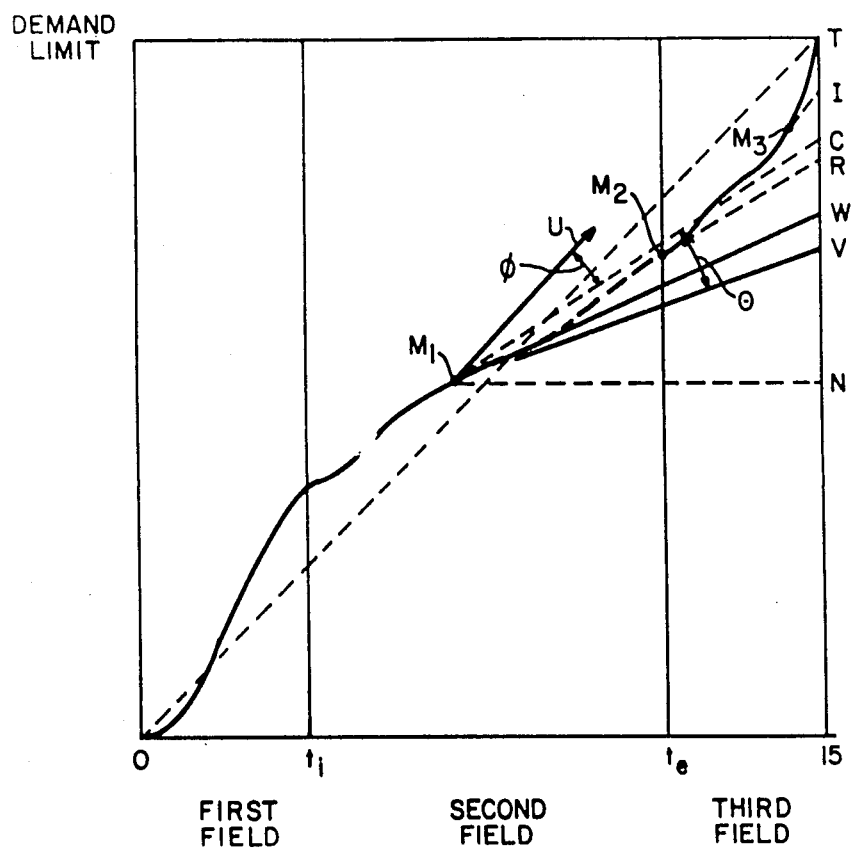
FIG. 5 is a diagram showing a typical strategy of control used for power demand control in the prior art.

The next decision is at 75 depending upon whether the system is under a first field shown from 0 to $t_1$ in FIG. 5, e.g., a first portion of the demand period for which no control is effected (NOC). When the first field terminates, the second field begins at $t_i$ which is a field of control, namely at B after step 75. If in response to the decision 75 the control system operates in the no control condition (NOC), the system goes to 109. As a result, the contact output handler will ascertain the status of the contacts. Considering now the chain starting at B for control operation, the second and third fields of control (from $t_i$ to $t_e$ and from $t_e$ to 15 minutes) will be explained by reference to FIG. 5. C represents the BIAS in the second field of control, T the original target corresponding to the desired Demand Limit (DEMLIN). The target (ITGTI) in the second field is represented by C, e.g., DEMLIN-BIAS. The control system (FIG. 4B) is set accordingly at step 76. A decision is made at step 77 to choose between the second and third field of control depending upon whether the time in demand period has reached $t_e$ (NFIN), or not. If we are still in the second field, the flow chart goes from 77 directly to step 79. If the third field is required, at step 78, the BIAS is reduced at each iteration until the end of the period. Accordingly, a fraction is used to reduce the BIAS by a ratio between the time left in the period and the duration of the third field. This amounts to a displacement of the target for each point on the trajectory. At steps 79 and 80 the demand error is calculated. ITGTI represents the ordinate of the target (C in the second field, I in the third field, T at the end of the demand period). The ordinate of N (see FIG. 5) is ITKWH obtained at step 168. The ordinate of W is ITKWH + ITEM (e.g., WN). Therefore, the error due to W being too low, or too high, relative to the target is Slope = IGTI − (ITKWH + ITEM). First, at step 79 ITEM is calculated, using data obtained at step 162 (IPWR = present power consumption), and computing the second term in equation (3), e.g., $P_i(T_{max}-t)$. Knowing ITKWH and ITEM, the demand error is calculated at step 80. Then the sign of the Y or N at 81 will tell whether the projected point W lies above or below the target. If it is above, the error is negative and loads have to be switched OFF. The flow chart goes to D. If point W lies below the error is positive and loads must be switched ON. The flow chart goes to C.

First, the situation when the error is positive will be considered, by taking the flow chart from C on, in order to find (1) whether there is a load to be switched ON, (2) whether a selected load can be switched ON by step 86.

The computer system then first looks for a load. Step 82 initializes a search for the least sheddable load.

In the table of priorities, the loads are classified from the least sheddable to the most sheddable (which can be understood as from the first to be switched ON to the last to be switched ON). In other words, the search goes from one end of the table when the search is to switch ON a load, and from the opposite end if the search is to switch OFF a load. (The last situation would be at D on the flow chart).

As a general consideration at this point (valid also for OFF switching at D) in a table can be stored or reserved in memory the following characteristics associated with each item of equipment to be of the switchable load type:

Equipment Identity No.
Power Consumed When Starting
Starting Period
Power Consumed When Running
Group Priority
Subgroup Priority
Maximum Allowable Off Time
Minimum On/Off Time Ratio
Minimum Time Between Starts
Availability For Use By The Demand Control System
Address of Associated Contact Output
Amount of Time 'Off' Since Being Switched Off - Updated Each Sec., or After
Amount of Time On Since Being Switched On Each KWH Pulse. The group priority is assigned by the user, the most sheddable loads being low numbers. Priority, or group, numbers increase with the importance of the load to the overall plant operatin. The programs associated with this table will be called immediately after the switching decision subroutine, or once per second, to effect: a search through the table to determine the identity of the next load to be switched and the power difference this will make. In the case of large starting currents, a check can be made to see whether starting this motor will cause the maximum demand to be exceeded. If so, the next motor in the sequence will be selected. Similarly, it can be presumed that if the sum of OFF plus ON time is less than the minimum between starts, another unit will be selected for switching on. In the case of large loads not directly controlled by the computer but for which the computer provides a permissive contact, a check will be made to determine whether the maximum time into the period has not been exceeded and close or open this contact accordingly (see Step 70 on FIG. 4A). If loads have imposed a maximum off time and a minimum on/off time ratio, the computer system would indicate a program to 1) switch that load ON regardless whenever the off time has exceeded the maximum allowable off time; 2) prevent the load from being switched OFF unless the ON/OFF time ratio is greater than the minimum allowed.

Returning to C on the flow chart (FIG. 4B), step 82 provides for indexation of the priority order ($N_1$) and of the subpriority order ($N_2$) for a load to be switched ON (INDUP). At step 83 the search is established accordingly. If the search has not provided a least sheddable load, the decision at step 84 is to go to K, e.g., a no control chain leading to a bid for the CO handler at 109. At step 109, the projection W on the final ordinate of the tangent from the point M on the trajectory (see FIG. 5) is determined as ITGT by the difference between the target and the error. Such information can be conveniently logged for the following reason. ITGT = Ordinate of target (C, if in the second field of control) - error (CW). This is the way ITGT is determined at step 108. But ITGT is also equal to: WN + ordinate of N (See FIG. 5). Since WN = ITEM and ordinate of N = ITKWH, both known by steps 168 and 79, then ITGT is known from previous computations. However, when late in the demand period ITEM becomes very small. Therefore, a log of ITGT provides a value which tends to be ITKWH equal to the final demand at the end of the demand period.

At step 109 the CO handler of the computer is called upon to check the contact outputs and there is a return to the task scheduler of the computer system.

If, however, a load to be switched ON has been found (NO at 85), (INDUP) the deadband is put into effect at step 85. If the deadband (LDINC) includes vector MW, then no control is effected (YES at 85) and the flow chart goes again to K (again a log of ITGT and a bid for the CO handler). However, if there is a NO at 85 then MW is outside the deadband (LDINC), control is possible and action is bid at step 86. At step 87 the new present power consumed IPWR is calculated by including the added power LDINC and due rotation is effected within a group of loads at step 89 if the load is one of a group.

Having called for the load to be ON, the ON time (ONTIM) for the particular load (or for the rortated group of loads if steps 88, 89 are followed) is initialized at 90 (E), while at step 91 a decision is made to print the "Switch-On" message (92) if the control operation requires it.

Considering now the decision at 85 to switch a selected load ON (if N) or not to switch (if Y), the error CW (FIG. 5 for second field of control) is compared with the increase of power LDINC expected. Control will occur only if LDINC is less than the error. If the selected load can be switched (85), the control action is determined at step 86 and the increased amount of power is accounted for in the new IPWR (step 87). Having called for the load to be ON, the ON time (ONTIM) for the particular load (or for the rotated group of loads if steps 88, 89 are followed) is initialized at 90 (E), while at step 91 a decision is made to print the "switch-ON" message (92) if the control operation requires it.

When the demand error (81) is negative a load must be switched OFF because ITGT is above the target. In such case, the flow chart goes to D (FIG. 4C). Steps 93 and 94 correspond to the steps 82, 83 encountered at C for the positive demand error. The search here is for the most sheddable load, thus from the opposite end of the table of priorities and subpriorities ($N_4$, $N_5$) as opposed to steps 82, 83 for ON switching. When no load to be switched OFF is found, the program indicates 100 as a flag. If this is the case, the flow chart goes to K, and no control is exercised as previously indicated with respect to steps 108, 109. If there is such a load (INDDN), the decision (95, N) is to test the relation of LDINC (the correlative decrease of power if the particular load were effectively switched OFF) to ITEMP which determines the deadband. Two situations happen at this stage depending upon whether the load exceeds 180 KW (Y) or not (N) and the decision is made at 97. If it is a Y, ITEMP is made half of what it is at step 96. In other words, 96 can be read as making the deadband ITEMP = LDINC and 99 as making the deadband ITEMP = ½LDINC. Assuming 97 leads to N, then ITEMP is made equal to LDINC. This means that at step 98 the slope (CW if in the second field) which is negative is in fact subtracted from LDINC. This difference is a residual error sign of which (in the second field 100 goes to 102) is checked for decision at 102 to control (103) or not (108) switching of the particular load. Again, if the vector or W is within the deadband (between MV and MC), there will be no control. If MW is outside the deadband, then the load will be switched OFF. If control is in the third field (101) then the system merely looks to the error (negative here) to switch (Y) or not the loads OFF.

Once a load is shed (at step 103) the present power IWPR is updated (104). At step 105, the OFFTIM (computed off-time of the load) is updated at each iteration. A decision is made thereafter to log the information (step 106) and to print a switch-OFF message (step 107). After each control operation (shedding or pickup), the energy estimated to be consumed is estimated (at step 79) and the demand error is again calculated in order to establish whether a new load should be switched ON (at C) or OFF (at D).

Once counting of time and power consumption has started for a given demand period, a first field is established during which the load system is left to its own constraints without control (75, 108, NOC). Since there is no control, the slope varies only with the loads. There is no need for a calculation of the slope at any point of the trajectory. Although there is no control during the first field, the status of certain of the interruptible loads may have changed during that time. For instance, in the particular example of the embodiment described, the OFF time of certain loads may have become excessive, and according to step 70, the contact output of such load would have been set (71). Therefore, the control system calls for the CO handler which is the software counterpart of the contact unit 5 (FIG. 2). Thus, a bid is made (109) for the CO handler in order to implement the status of the contact outputs established by the previous iteration.

The system then returns to the task handler. The first field ends at time $t_1$ (FIG. 6) and a second field is established thereafter (N,75).

It should be observed here that there is a difference between (1) the switching ON of a load which has been OFF for an excessive OFF time, such as operated by the system at 70 and 71 (FIG. 13A) and (2) the switching ON of a selected load such as at 86 on FIG. 13B. When there has been an excessive OFF time, the system indeed provides for the switching ON of the load. However, such switching is not really a "controlled" switching in the sense that (a) there is no selection made of the load, no prediction made of the KWH and no decision is done to switch under predetermined conditions which suppose alternative situations; and (b) the additional load created at 70 and 71 might go against the overall objective to limit the demand. In contrast, when switching ON a load at 86, a selection (82,83) is made and the decision to switch is based on an anticipation (80) of an error. Therefore, when referring to switching such as at 70, e.g., under the constraints assigned to the load, the load should be considered as in a "non-controllable" status.

Figure 10:
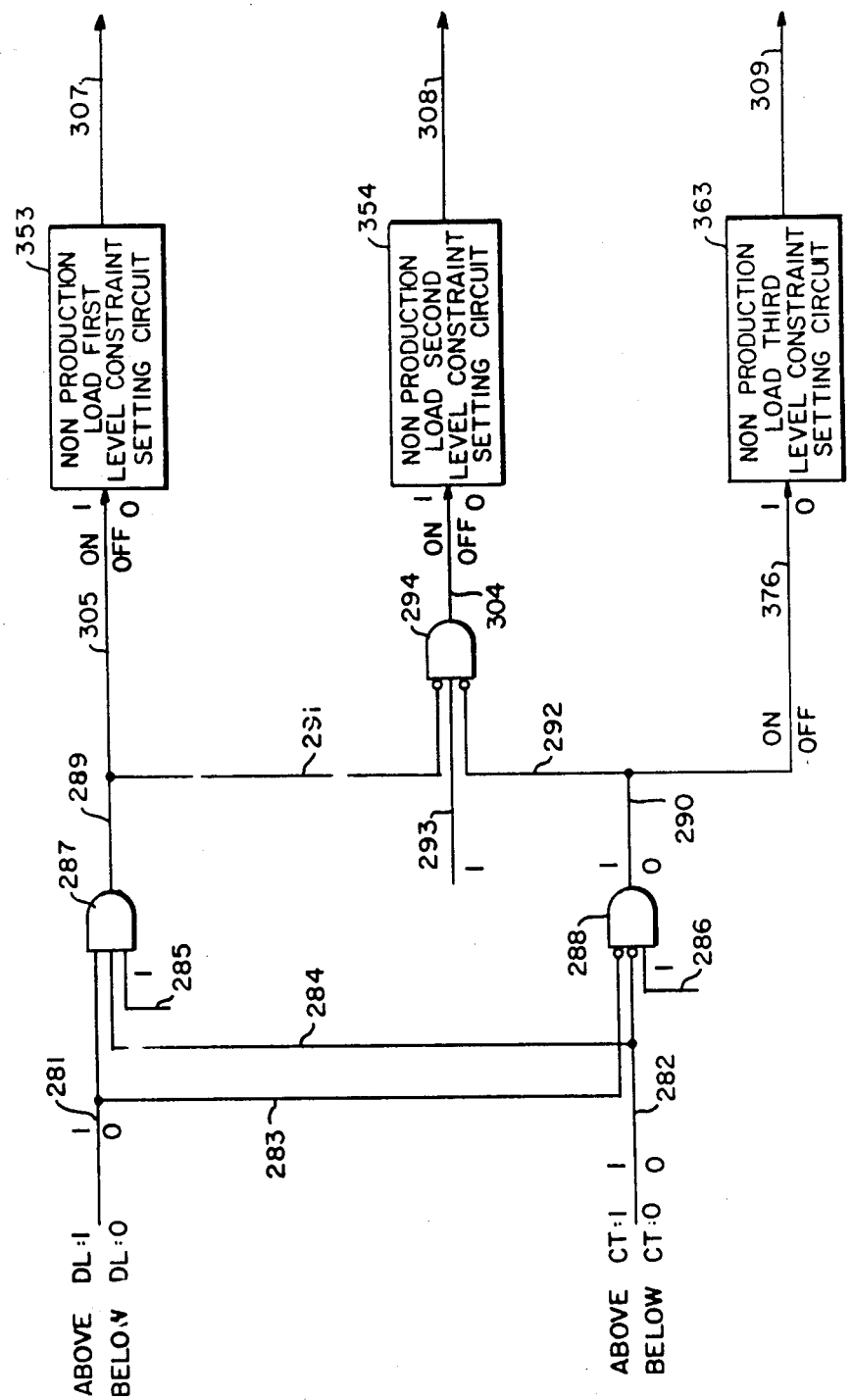
FIG. 10 illustrates a logic circuit that can be used in the system schematized on FIG. 6.

An important application of the control system can be found when the industrial plant includes among other interruptible and switchable loads, one load for instance, which could not be switched without causing overshooting of the target T, such as at CR at point C of the trajectory I on FIG. 10. By reducing the demand limit to T during a portion of the demand period, for instance, from time 0 to time $t_b$, the control system will operate more rigidly against the constraints (DEMLIN at step 76 on FIG. 13B) and the trajectory followed will be I', as shown on FIG. 10. The demand control system escribed hereabove, is capable of determining at which time $t_b$ the projected line representing the load which could not be switched will intersect the last ordinate at T, the desired demand limit. To do this, it is sufficient for instance, that the computer system at 76 (FIG. 13B) identifies the target (T' first, then T) and determines an error on selection (82) which is zero.

A remark can be made regarding the overall operations of this particular control system. Since loads in a non-controllable status spontaneously are switched ON when their OFF time has been exceeded, when a flag 100 has appeared to indicate that no load is available to be shed, the system will by itself become effective for control since more loads will become available at the next iterations.

DESCRIPTION OF THE STEPS OF THE METHOD ACCORDING TO THE INVENTION BY REFERENCE TO THE OPERATIVE CONDITIONS OF THE CONTROL SYSTEM OF U.S. PAT. NO. 3,872,286

Figure 6:
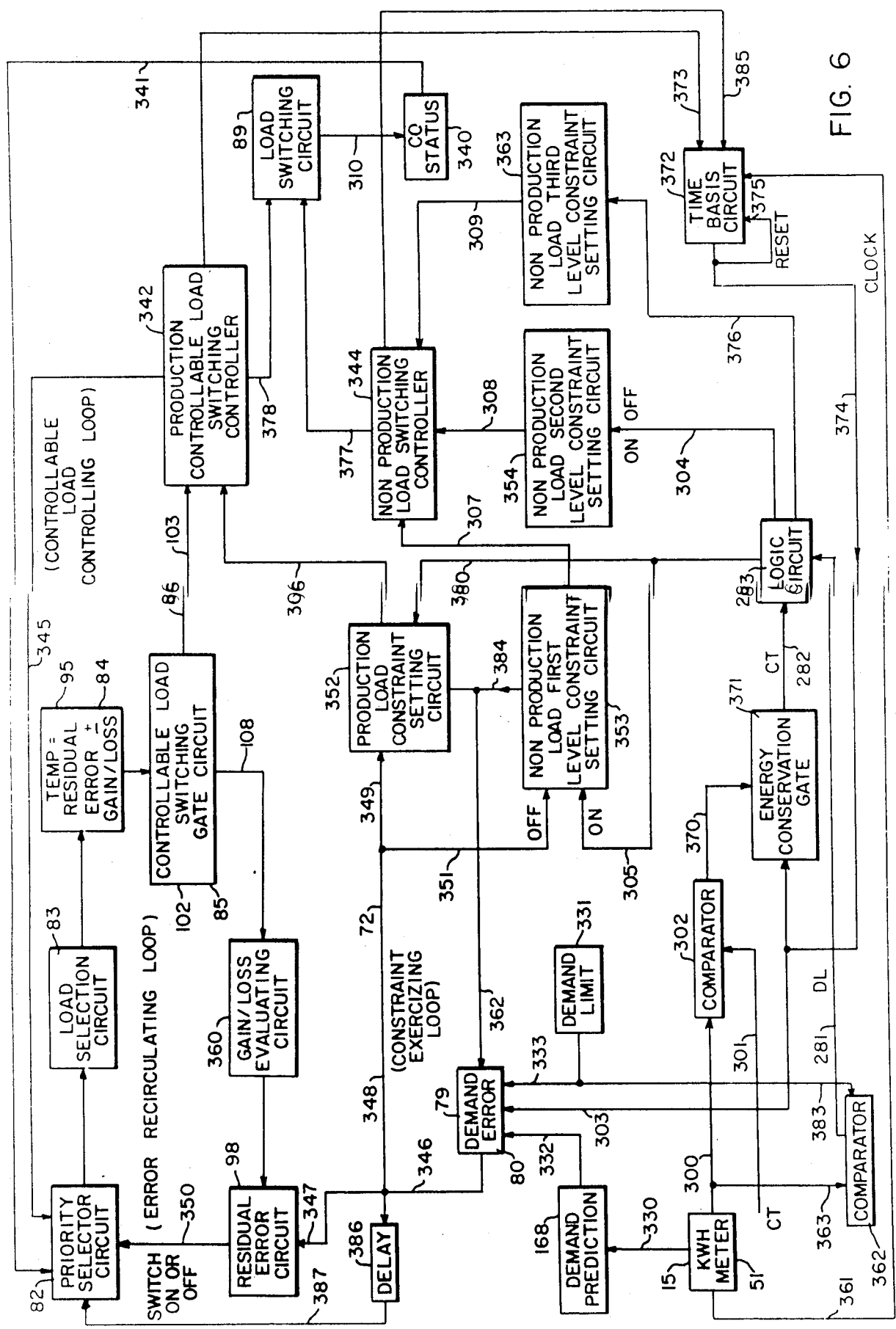
FIG. 6 is a diagram showing the operative characteristics of the control method according to the present invention in the context of a power demand control system described in U.S. Pat. No. 3,872,286 of Putman.

Referring to FIG. 6, for the sake of clarity the steps of the method according to the invention are illustrated in block diagram and by reference to the flow charts of FIGS. 4A–4C, thus functionally describing the invention in terms of the control system of U.S. Pat. No. 3,872,286. The main functions used in the preferred embodiment of the invention are indicated on FIG. 6 and all blocks which have already been explained by reference to FIGS. 3 and 4A–4C have been referred to by the same reference numerals wherever found in those early figures.

The KWH meter (15, 51) of the power company provides on line 330 an indication of the power consumed every time the wattmeter has completed one revolution. As explained hereabove by reference to FIGS. 1 and 5, the wattage indicates the slope of the tangent at the operative point (M, $M_1$) on the demand curve (OM, $OM_1$). This slope is used to extrapolate to the end of the 15 minute demand period. The extrapolation by the demand prediction block 168 estimates the segment NC (FIG. 5) supported by tangent $M_1C$. The error CT established by reference to the assigned demand limit is calculated by demand error block 79, 80 which is responsive to signals on lines 332, 333 from the demand prediction block 168 and the demand limit block 331, respectively.

Turning now to the right side of FIG. 6, the load switching circuit 89 represents an array of individual switches such as (8, 9) in FIG. 2. A CO status circuit 340 translates the switching of loads on line 341 to a priority selector circuit 82. The load switching circuit is controlled by load switching control circuits 342, 344, affected to production controllable loads, production non-controllable loads and non-production loads, and non-production loads, respectively.

The production controllable load switching controller 342 is gated by controllable load switching gate circuit (102, 85) from lines 86, 103, whenever switching of the particular load is permitted. Selection of a controllable load results from positive decision in an error circulating loop comprising residual error circuit 98, priority selector circuit 82 (as affected by the status of the contacts CO form line 341) and the effective successive earlier operations of the production controllable load switching controller 342 (as reflected from line 345 to riority selector circuit 82 in a controllable load controlling loop). The error is recirculated in a loop from priority selector circuit 82 into a load selection circuit 83. This loop provides a tentative computation of residual error and gain (or loss) in 95, 84, which is the calculation of TEMP. As a result of such calculation the controllable load switching gate circuit (85, 102) will allow, or not allow, switching. If switching via 86, 103 is not allowed, the error circulating loop closes via line 108 on the residual error circuit 98 through a gain (or loss) evaluating circuit 360, which in turn will cause another scanning of the priority selector circuit 82 for another iteration. The demand error derived on line 346, 347 is applied to the residual error circuit 98. As a result, the determined power gain or loss due to the switching of a prospective controllable load by controller 342 and load switching circuit 89, once translated via 45 into the priority selector circuit 82, is subtracted from the predicted demand error on lines 346, 347 thus providing a residual error on line 350, thereby to cause a search for an available load by scanning through the priority selector circuit 82.

The demand error takes into account not only the prediction of the demand (168) at the time and the assigned demand limit (331) but also the constraints which have been exercised in the meantime by the constraint exercising loop which is effective on the production and non-production loads having a first level of constraints. (See circuit 353). As earlier explained, the constraints when exercised may cause a load to be inhibited from switching, or become available for switching, depending upon the ON/OFF ratio established for a particular load, the permutation order under load rotations, the expiration of the ON-time, or of the OFF-time. After a demand error has been determined on line 46, and before any calculation of the residual error by block 98, the constraints are exercised via lines 348, 349 onto the production load constraint setting circuit 352 and via lines 348, 351 onto the non-production load first level constraint setting circuit 353. Block 352 establishes the preset constraints for the production loads of the controllable type, e.g. onto controller 342. Block 353 establishes the preset first level of constraints for the non-production loads, via line 307 onto controller 344. The load switching circuit 89 will effect switching of the selected controllable loads.

The diagram of FIG. 6 further includes a comparator 302 which is responsive to the instantaneous KWattage from the KWH meter (15, 51) on line 300 and to a reference signal on line 301 representing a lower limit CT in the KWH level of the KW meter readings. Comparator 302 operates as a threshold device to distinguish between actual demand above or below CT. That the threshold be reached or not downward, a logic signal on line 370 is applied as an input to an energy conservation gate 371. Gating of circuit 371 is conditioned by a time basis circuit 372 which establishes an enable signal on gate line 374, provided no control by the demand control system, e.g. via production controllable and non-production load switching controllers 342 nd 344 has occurred for a full demand period. The demand period is accumulated in the time basis circuit 372 from a clock signal on line 361 from the KWH meter 15. Occurrence of control during the period is detected from time to time via lines 373 and 382 from the r pective circuits 342 and 344. Time accumulation is started at the beginning of the period e.g. after reset on line 375. If control did not occur for a full 15 minutes, the outputted signal on line 374 gates circuit 371 for energy conservation and disables power demand control via line 303 to the demand error circuit 79, 80. The logic signal on line 370 is then passed by gate 371 via line 282 onto a logic circuit 283, illustrated by the diagram of FIG. 10. The logic circuit is also responsive to the output signal from a second comparator 362 on line 281. Comparator 362 serves as a threshold device in response to actual demand on lines 300 and 363 from meter 15, 51 and to a reference signal on line 281 from demand limit 331 representing the assigned demand limit DL for control. As a result, the logic signal outputted on line 281 is indicative of whether the demand is above or below DL at any given time. The signification of logic signals of lines 281 and 282 will appear from a consideration of curves 7A, 7B and 7C. The operation of logic circuit will be described hereinafter by reference to FIG. 10. Operation of the system under energy conservation is to be understood from a consideration of FIG. 6 and of FIGS. 8 and 9.

Referring to FIG. 6, the logic circuit has three outputs. A first output, via line 305, enables or disables a non-production load first level constraint setting circuit 353 and via line 380 enables or disables production load constraint setting circuit 352. The second output, via line 304, enables or disables a non-production load second level constraint setting circuit 354, while a third output, via line 376, enables or disables a non-production load third level constraint setting circuit 363. Circuit 353 establishes a first level of constraints on the non-production loads. As a result of such choice, the ON/OFF ratios of the various loads is selected so as to meet the needs of normal production activity. The constraints set by circuits 352 nd 353 are exercised and accounted for in a constraint energizing loop comprising during demand control, the demand error circuit 79, lines 348, 349, 351, and 364, 362. Conroller 342 is controlled by circuit 352 via line 306, while controller 344 is controlled by circuit 353 via line 307.

During energy conservation the production load constraints of circuit 352 are no longer effective in the absence of power demand control, nor are those normally set by circuit 353 for the first level of constraints. Instead, either the second or the third level of constraints, by circuit 354, or circuit 363 are effective, depending upon enabling from output line 304 or 376 of the logic circuit 283. The non-production load switching controller 344 is actuated via lines 308 or 309 from circuit 354 or 363.

The first level of constraints established by circuit 353 is scheduled to meet the conditions of a plant having normal production activity. Since the heavy production units are on duty, all supporting loads are also on duty. All the auxiliaries, such as air conditioners, hall and corridor lights are ON. Production activity entails human activity in the plant. Air conditioning, lights, elevators, cafeteria, library, warehouse, and other non-production loads are operative under a constraint level which favors production, assures maximum confort and safety for the working teams and staff.

Figure 7C:
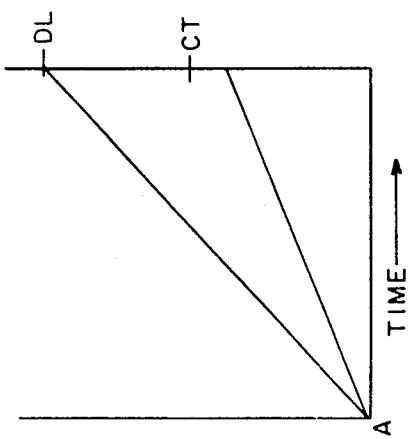
FIGS. 7A, 7B, 7C show the demand for three different modes of control.
Figure 7B:
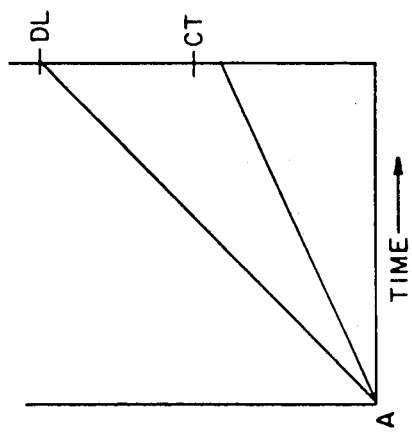
Figure 7A:
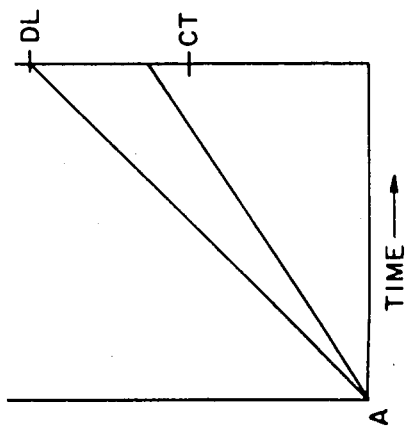

Should, however, the production acitivty be discontinued or reduced, as happens in the day or at the end of a workday, or at the weekend, or during a general holiday, many loads besides the production units can be dispensed off in an energy conservation program. Curtailment of energy requirements compatible with safety and good management of a plant in reduced activity or at sandstill is a source of savings. According, during energy conservation the constraints of the non-production loads are being set to selected levels defined by circuits 354 and 363. In such case the energy conservation gate 371 is enabled from line 374, and the demand error circuit 79, 80 is disabled via line 303. It is observed here that elimination of demand control as a whole is in order. Since production has become in actuality very low in the plant, no heavy loads are being switched ON, and the necessity to shed loads by residual error to stay on target using the priority selector circuit (95, 84) no longer exists. This absence of control is reflected by the load switching circuit through the production controllable load loop (342, 345). In other words, when the plant is set by management at standstill at the end of the day or week, power demand control by itself becomes inactive, except as the non-production loads and non-controllable loads which are under pre-established constraints. It is at this moment that comparators 302, 362 intervene in rescheduling the entire consumption program of the inactive plant for the purpose of energy conservation. Instead of relying only upon the recorded demand input from the power company at the KWH meter, it is proposed as a preferred embodiment for energy conservation, to rely on the effect on the power demand controller of a drop in the call for power from the plant, when the production activity has sharply decreased. When the demand is large, power demand control effectively limits the demand by shedding loads in accordance to the priority list of the priority selector, thus keeping the demand close to the assigned target. When the demand is reduced, the system no longer controls any sheddable loads, because there is no demand for it. Accordingly, a decision is made to abandon the first level of constraints which had been set for production acitivity conditions, and to substitute a second level constraints under norms of energy conservation. Such decision is taken whenever the power demand controller has been inactive during a full 15 minutes, or demand period. If this is the case, the energy conservation load control mode is set up for the subsequent demand period, and it will be repeated from demand period to demand period as long as the conservation threshold given by the comparator is exceeded downward. Referring to FIGS. 7A, 7B, 7C, DL represents the demand limit, CT the conservation threshold. A-DL is the ideal demand curve, A-CT is the actual demand plot. During period #1, actual demand is below the target demand level, and it is assumed that the computer did not control any loads (FIG. 7A). Following such lack of control in period #1, energy conservation becomes active during period #2. The test is that the actual demand in period #1 was above the conservation threshold and below the target demand and that no loads are turned OFF for demand control. The conservation loads are therefore cycled according to the ON/OFF ratio defined by the second level of constraints (FIG. 7B).

When period #3 follows, demand control is still inactive (actual demand below the target) and energy conservation is continued. Since the demand is below the conservation threshold the loads are cycled according to a third level of constraints (circuit 363 of FIG. 6 and FIG. 7C). As soon as demand control resumes because the actual demand again exceeds the target (DL) and a demand period occurs during which control of production loads is effected the control system reverts to the first level of constraints. The energy conservation gate is disabled and the system is no longer in the energy conservation mode. The demand control mode has overridden the energy conservation mode.

Referring to FIG. 10, the logic circuit of FIG. 6 will now be described. It is understood that this description is only illustrative of a specific mode of implementation. The signals on line 281 from comparator 362 (FIG. 6) is a ONE if the demand is above the demand limit DL and a ZERO if below (see FIGS. 7A-7C). The signal on line 282 from comparator 302 (FIG. 6) is a ONE if the demand is above the value CT, a ZERO if below CT. AND device 287 has three input lines 281, 284 nd 285. 285 carries always a ONE, line 284 is connected to line 282. As a result for a ONE on both 281 and 282, the output of 287 is a ONE which is fed as enabling signal on line 305 to circuit 353 (FIG. 6).

A second AND device 288 is provided with three input lines 283 from line 281, 282 and 286. The input on lines 283 and 282 are inverted and the input on line 286 is always a ONE. Therefore, at the output of device 288 the value is a ONE when the demand is below DL (on 281) and below CT (on 282). The output of device 288 is fed via lines 290 and 376 to circuit 363 (FIG. 6), so that under the stated example, this circuit is enabled. A third AND device 294 has three input lines 291 from device 287 and 292 from device 288 which are both inverted. The third input line 293 has always a ONE. The output line is 304 to circuit 354 (FIG. 6). Therefore, circuit 354 (FIG. 6) is enabled whenever the demand lies between DL and CT (see FIGS. 7A-7C).

Figure 8:
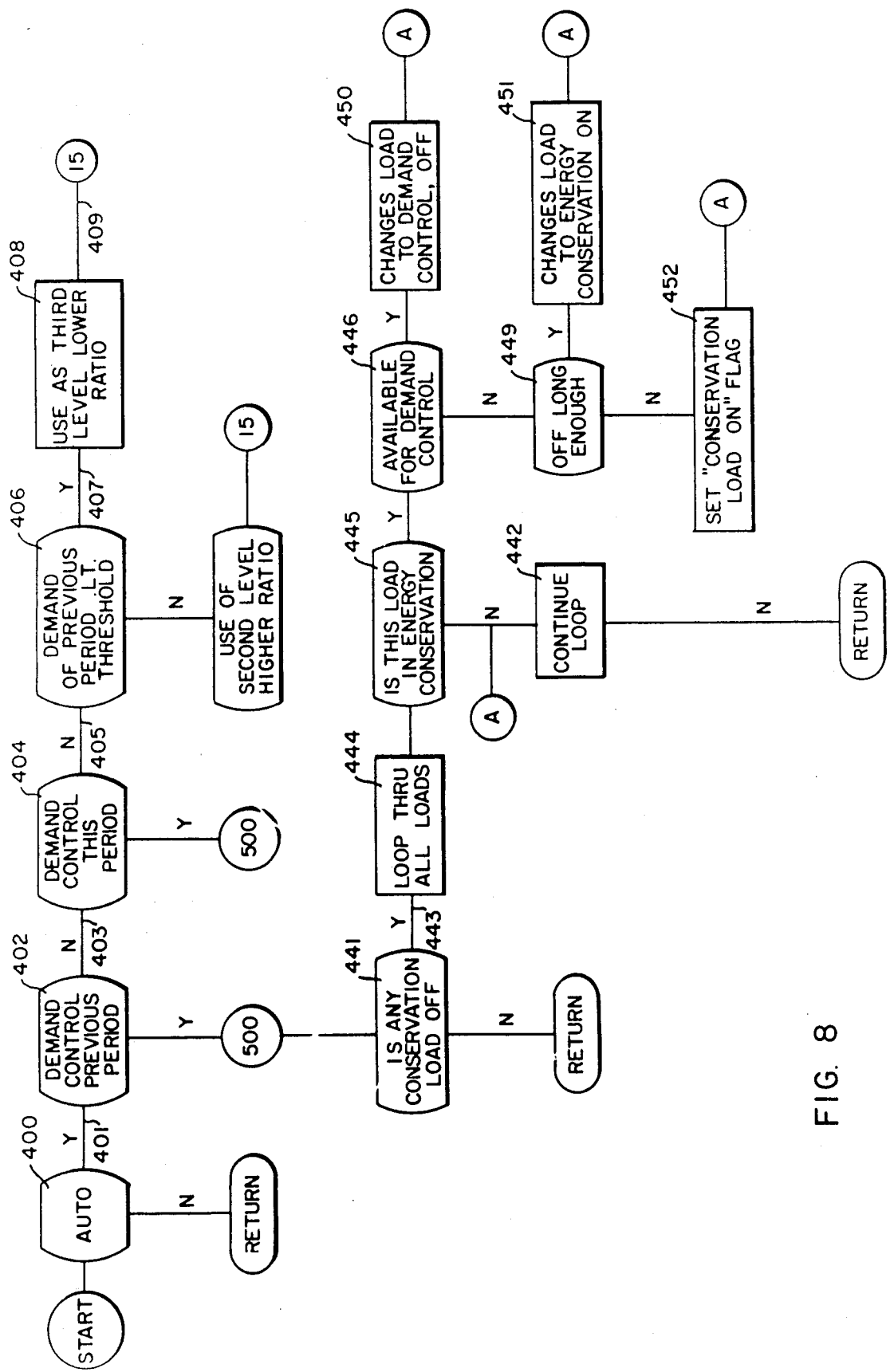
FIGS. 8 and 9 are flow charts describing the operative steps of a control method according to the present invention.
Figure 9:
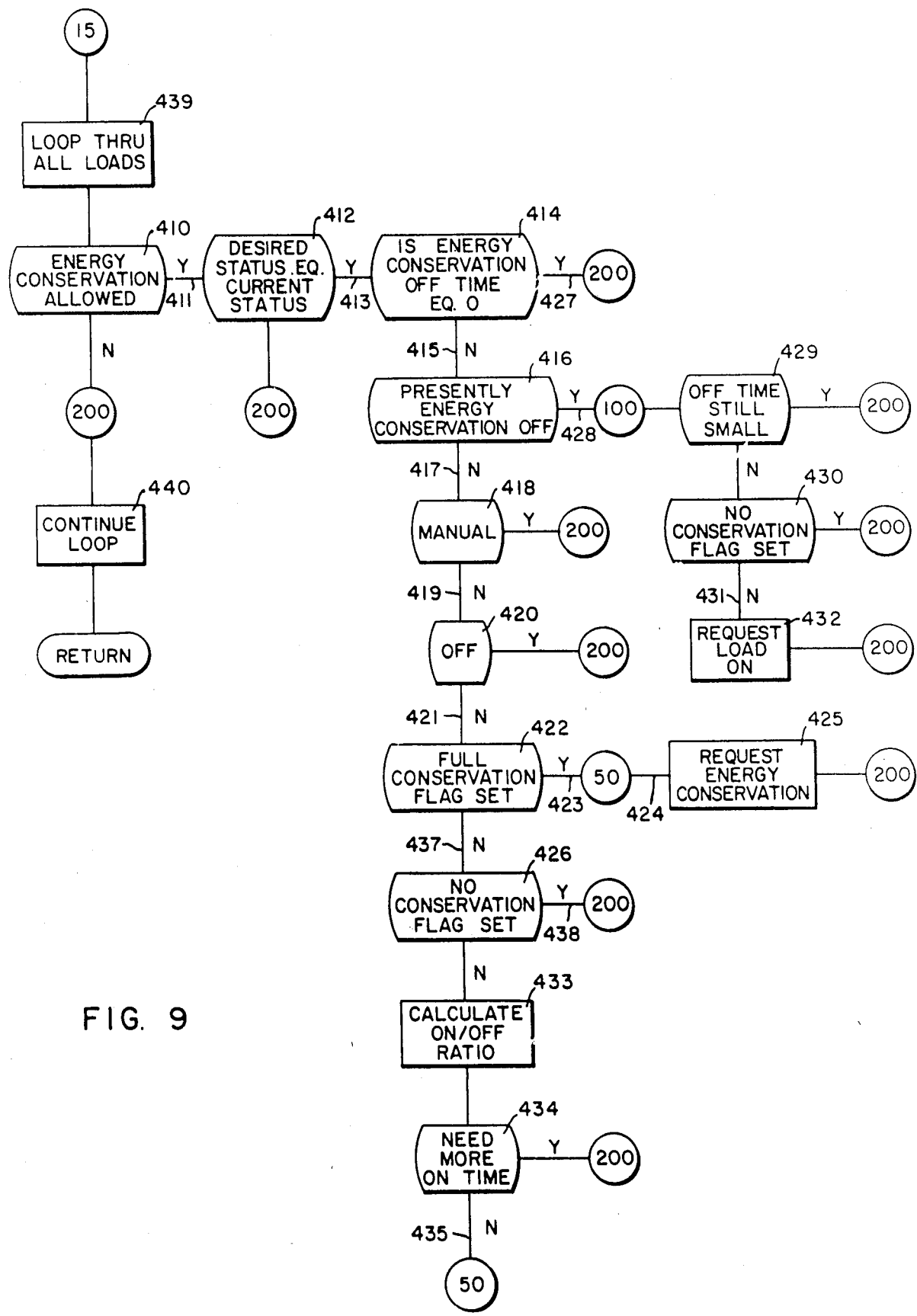

Referring to FIGS. 8 and 9, the energy conservation mode will now be described in the preferred embodiment when a computer is programmed for energy conservation, and such program is being substituted for the power demand control program whenever the conservation threshold has been reached. FIGS. 8 and 9 are flow charts to be understood by reference to steps A, 15, 50, 100, 200 and 500 of the following program listing:

ENERGY CONSERVATION

```
        SUBROUTINE CONSER (KD,N,NP,IX)
        INTEGER KD(N,NP)
        GLOBAL MANUAL
        GLOBAL CTHRES
        GLOBAL IECFLAG1, IECFLAG2, IECFLAG3
        COMMON/DEMLCM/DLLIM, DLKW, DLPWR, LDK, LTIM,
        XIHR, IMIN, IHPSI, ISEC
        DATA IX1000, IX10001, IX2000, IX1/$1000, $1001, $2000, $0001/
        IF (MANUAL. NE.1) RETURN
    C   TEST FOR COMPLETE PERIOD WITH NO D,C,              - Continue if in Automatic
        IF (IECFLAG2. NE.0) GO TO 500
    C   TEST FOR D.C. THIS PERIOD                          - If conservation threshold is greater than
        IF (IECFLAG1. NE.0) GO TO 500                        demand of previous period, use lower ratio
        IF (CTHRES. GT. DLKW) GO TO 10
        INDEX = 16
        GO TO 15
10      INDEX = 15
15      DO 200 I = 1,N
    C   TEST THIS LOAD FOR POSSIBLE E.C. CONTROL
        ITEM = KD (I,13)
    S   AND IX1000                                         - Is desired status equal to current status
    S   ZJP )200
        IF (KD(I,9).NE.KD(I,10)) TO TO 200
        IF (KD(I,14).EQ.0)GO TO 200                        - Is energy conserve off time equal to 0
    C   IS LOAD CURRENTLY E.C. OFF
        IF (KD(I,10). EQ.IX1000) GO TO 100
        ITEM = KD (I,10)
    S   NJP )200                                           - Is load in auto
    S   AND IX1
    S   ZJP )200
    C   CHECK FOR AN ON/OFF RATIO OF ZERO
    C   IF YES TURN LOAD OFF AS LONG AS CONSERVATION IS ACTIVE
    C   OR THE DEMAND IS SUCH TO PRODUCE THIS INDEX
        IF (KD(I,INDEX). EQ.0) GO TO 50
    C   TEST FOR AN ON/OFF RATIO OF GREATER THAN 32000
    C   IF YES EXCLUDE THIS LOAD FROM E.C. DURING THIS REGION
    C
        IF (KD(I,INDEX).GT. 32000) GO TO 200
    C   CALCULATE ON/OFF RATIO IN REAL TO ALLOW FOR FRACTIONS
        TEM = KD (I,8)
        ATEM = KD (I,7)
        TEM = (TEM/ATEM) *100.
        ITEM = TEM
        IF (ITEM.LT.KD(I,INDEX)) GO TO 200                 - Is more "on" time needed
    C   TURN LOAD E.C. OFF
50      KD(I,9) = IX1000
        IX = 1
        IECFLAG3 = 1
        GO TO 200
100     IF (KD(I,7).L7.KD(I,14)) GO TO 200
    C   DO NOT RESTORE LOAD IF ZERO ON/OFF
        IF (KD(I,INDEX).EQ.0) GO TO 200
        KD (I,9) = IX1001
        IX = 1
200     CONTINUE                                           - Is any conservation load off
        RETURN
    C   CONSERVATION NOT ACTIVF
500     IF (IECFLAG3. EQ.0) RETURN                         - Is this load on energy conservation
        INDEX = 0
        DO 600 I = 1,N
        IF (KD(I,10).NE.IX1000) GO TO 600
    C   CHECK IF LOAD IS ALSO A DEMAND CONTROL LOAD...
    C   IF SO, CHANGE CURRENT STATE FROM E.C. OFF TO D.C. OFF
        ITEM = KD (I, 13)
    S   AND IX2000
    S   ZJP )505
        KD (I,9) = IX2000
        KD (I,10) = KD (I,9)
        GO TO 600
    C   SEE IF LOAD HAS BEEN OFF LONG ENOUGH
505     IF (KD(I,7).LT.KD(I,14)) GO TO 510
    C   TURN LOAD TO E.C. ON
        KD(I,9) = IX1001
        IX = 1
        GO TO 600                                          - Are all conservation loads off
510     INDEX = 1
600     CONTINUE
```

-continued
ENERGY CONSERVATION

```
IF (INDEX. EQ.0) IECFLAG3 = 0
RETURN
END
```

ENERGY CONSERVATION LISTING TERMS

| NAME | TYPE | FUNCTION |
|---|---|---|
| MANUAL | LOGICAL | 0 = MANUAL = AUTO |
| IECFLAG2 | INTEGER | 0 = No demand control for previous period |
| IECFLAG1 | INTEGER | 0 = No demand control for this period |
| CTHRES | REAL | Energy conservation threshold |
| DLKW | REAL | Demand of the previous period |
| KD(i,13) | INTEGER | Allowable control mode flag for each load |
| KD(i,9) | INTEGER | Desired load status for each load |
| KD(i,10) | INTEGER | Current load status for each load |
| KD(i,14) | INTEGER | Energy conservation OFF-time for each load |
| KD(i,15) | INTEGER | Lower ON/OFF ratio for each load |
| KD(i,16) | INTEGER | Higher ON/OFF ratio for each load |
| KD(i,8) | INTEGER | ON-time for each load |
| KD(i,7) | INTEGER | OFF-time for each load |

The program is started (FIG. 8) and if the system is set for automatic running (400), (Yes on 401) it is established whether there was demand control during the previous period (402). If there was no demand control (NO on 403) it is ascertained whether for the new period there is demand control (404). If there is still none (NO on 405) it is determined whether the demand of the previous demand period was lower than the threshold (CT on FIG. 7A). These two conditions being satisfied, there is a Yes on line 407, and the decision is to use the third level of constraints (408). In such case 408 goes via 409 to 15 of FIG. 9. Referring to FIG. 9 the system loops through all nonproduction loads, e.g. the conservation loads (402) and the test is made for each load, whether energy conservation is allowed (410). If there is a Yes on 411, the load is checked as to whether it is at the status indicated by the third level (412). If it is, and the OFF time is not 0, indicating the load cannot be put under energy conservation, (414 and 415).

The flowchart goes through other branches in FIG. 9 corresponding to the following conditions: the system is still on energy conservation (416, 417); the load is not on manual (418, 419); nor OFF (420, 421); and the flag has been set for full conservation (level 2 of the constraints) (422, 423). Then, there is a request for energy conservation (424, 425). After this the system goes to 200 while the loop has been exercised for all the loads by 439. There is also a go to 200 whenever 412 is a No; or the OFF-time is zero (414, 427) the energy conservation is OFF (416, 428) and the OFF time is still small (429); or if at 429 there is a No and the conservation flag is not set (430); or with conservation flag (431) there is a request to have the load ON (432). The same call to go to 200 occurs whenever full conservation flag is set (422), (437) and no conservation flag set (426, 438) or, if set, the calculated ON/OFF ratio (433) shown that more ON-time is needed (434). Otherwise (422) by 50 a request for energy conservation (424, 425) is made with a subsequent go to 200.

From 200 after a continue to loop (440) the system returns to the question whether there has been power demand control in the previous demand period (402) with the same series of demand steps.

If there had been a demand control during the previous demand period (402), the question is raised (441) whether there is any conservation load OFF. If there is none (442) no problem, the system returns. If there is one (443) the system looks for it (444). If such load is in energy conservation (445) and it is available for demand control (446) the load in the OFF status becomes part of the table of the available loads in the priority selector circuit and the system loops through all such possible loads to revert more fully the system to power demand control (by A to 447 and 448 if all conservation loads are OFF with return to interation at 400.

If the load has been OFF long enough (440) and was found not to be available for demand control (446) the load is changed to energy conservation as an ON load (451) and the system goes to A. If the load has not been OFF long enough, the flag "conservation load ON" is set (452) and the system goes to A.

To summarize, the present control system uses computer technique and puts into effect a program to conserve energy in periods of low demand. This supplies a new classification of loads to be routinely cycled on-off under load oriented constraints during periods where actual demand is below the target demand and demand control is not active.

The energy conservation program employs a new control algorithm which is separate from demand control. The energy conservation program is preferably activated only after a demand period has been completed and no loads were then switched by the demand control. It is deactivated at the first threshold point where demand control becomes necessary. Whenever the system is in the manual mode conservation control is inhibited.

The loads controlled by the conservation program are a subset of all the defined switchable loads in the system. This implies that:

(1) All defined loads have only one system control point, (i.e., screw connection).
(2) The selection of which loads can participate in energy conservation is an operator function.
(3) The accumulation of load time data (i.e., off time, on time) must be in common tables so that a dynamic mode switch between conservation control and demand control will not violate load standards.

Using actual plant demand as an indicator of plant activity, the on-off ratio of conservation loads can be selected to optimize energy conservation and plant requirements. Two separate tables of on-off ratios for conservation loads are employed. During periods of low plant activity (low actual demand) a ratio borrowed from one of these tables (2nd level) is used. During periods of high plant activity (high actual demand) the ratio is taken from the other table (3rd level. Most of conservation loads are those which assist in human comfort (heat, air conditioner, etc.). Thus human activity reflects production activity and conversely. Periods of high plant activity (high actual demand) imply that the majority of plant personnel are on the job, whereas periods of low plant activity (low actual demand) coincide with the time when the plant is empty of personnel. Therefore, more rigid on-off ratios would be in effect during periods of low plant activity.

The selection of which table of conservation on/off ratios to be used is made throughout the demand period. The on/off ratios of all loads under conservation control are operator variable. The high/low conservation threshold value (expressed as a demand from the KWH meter) is a variable entered by the operator.

We claim:

1. A method of controlling the operating status of the loads in a plant facility having production loads and nonproduction loads supplied with energy from a utility company, with said production loads being capable of being switched selectively in accordance with a desired production activity level and said nonproduction loads being operative under selected constraints, comprising the steps of:
   deriving as a function of time an indication of the actual demand of energy by said plant facility; and
   altering said constraints in relation to the derived indication of the actual demand of energy to establish constraints compatible with different levels of production activity in said plant facility.

2. The method of claim 1 in which said altering step is effective upon detection of a critical event representing a lower level of production activity in said plant facility to establish a higher level of constraint campatible with said lower level of production activity.

3. The method of claim 2 further including the steps of comparing the actual demand indication derived by said deriving step to a reference representing a minimal level of production activity in said plant, said altering step being initiated in relation to said comparing step to alter said constraint from said higher level to a maximal level compatible with said minimal level of production activity.

4. The method of claim 3, including the steps of controlling said production loads during successive control periods in accordance with a predetermined power demand limit to be met at the end of any such control period;
   an initial level of constraints being assigned to said nonproduction loads during control operation under said controlling step, said altering step being initiated in the absence of said controlling steps being effectively taken during one control period to establish said higher level of constraint by reference to said initial level.

5. The method of claim 4 in which when said altering step is initiated said controlling steps are prevented from being performed.

6. The method of claim 5 in which when an indication of normal production activity in said plant activity is received, said constraints are reset to said initial level and said controlling steps are resumed.

7. A method of controlling the operating status of the loads in a plant facility supplied with energy from a utility company, with said loads being capable of being switched selectively in accordance with a desired production activity level, comprising the steps of:
   assigning to selected loads a conservation and a production status;
   shifting the status of at least one of said selected loads from a production to a conservation status in response to a predetermined change downward in the energy demand registered during a preceding demand period; and,
   changing back the status of at least one of said selected loads from a conservation status to a production status in response to a predetermined change upward in the energy demand registered during a subsequent demand period.

* * * * *